Aug. 31, 1948.                     E. R. KOPPEL                     2,448,183
                                 DAIRY WATER HEATER
Filed Dec. 8, 1944                                              2 Sheets-Sheet 1

Ernst R. Koppel
INVENTOR.

BY
ATTORNEY.

Aug. 31, 1948.                E. R. KOPPEL                2,448,183
                            DAIRY WATER HEATER
Filed Dec. 8, 1944                                      2 Sheets-Sheet 2
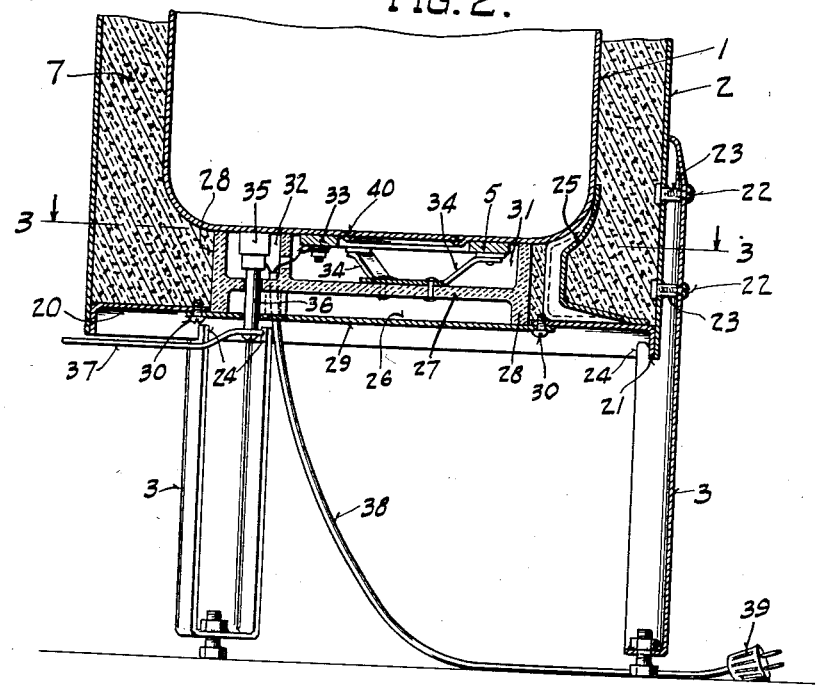
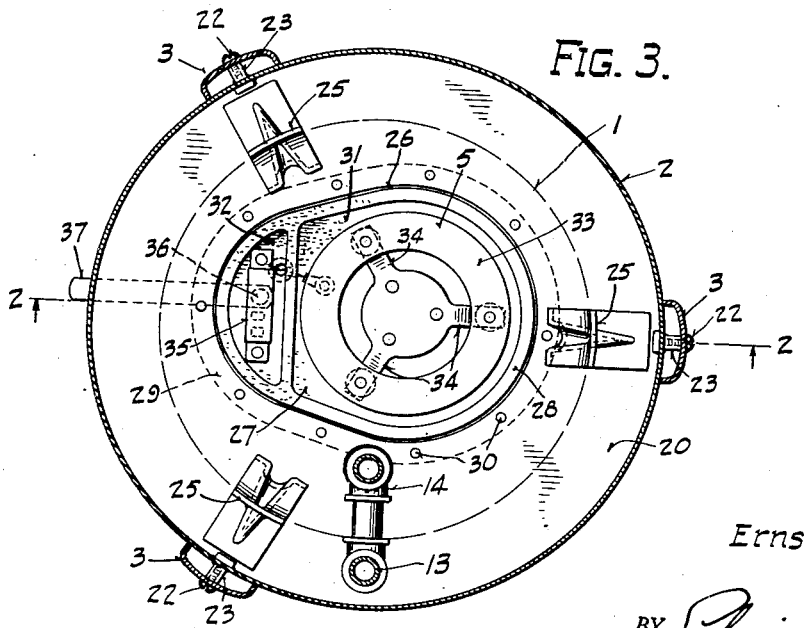
Ernst R. Koppel
INVENTOR.
BY
ATTORNEY.

Patented Aug. 31, 1948

2,448,183

UNITED STATES PATENT OFFICE 2,448,183

DAIRY WATER HEATER

Ernst R. Koppel, Chicago, Ill., assignor to A. O. Smith Corporation, Milwaukee, Wis., a corporation of New York Application December 8, 1944, Serial No. 567,252

7 Claims. (Cl. 219—39)

This invention relates to a dairy water heater of the gravity feed type having a thermostatically controlled electric resistance heating unit, an insulated water storage tank and a syphon discharge pipe.

The general object of the invention is to provide a simpler and less costly construction.

Another object of the invention is to provide a construction of the several parts which may be more readily assembled.

A more specific object is to provide an improved removable upper inlet pan of less height and not so susceptible of injury around its upper edge.

Another object is to provide a removable heating unit and thermostat assembly which allows for ready servicing of all electrical parts without draining of the tank.

Other objects and advantages of the invention will appear hereinafter in connection with the description of an embodiment of the invention illustrated in the accompanying drawings.

In the drawings:

Fig. 2 is a vertical section of the lower portion of the heater taken on line 2—2 of Fig. 3; and Fig. 3 is a transverse section of the heater taken on line 3—3 of Fig. 2, the indication of insulation being omitted to more clearly show the construction.

Figure 1:
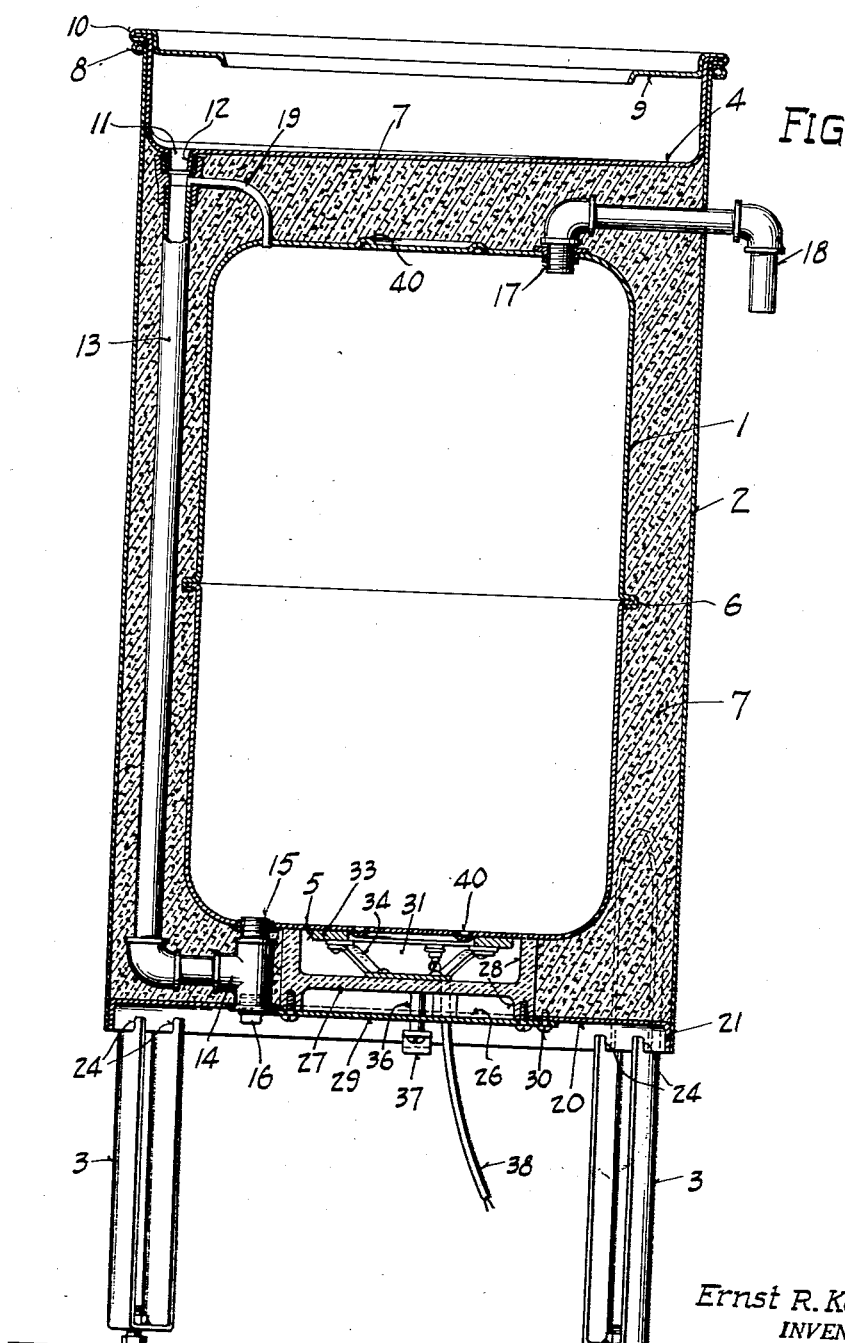
Figure 1 is a central vertical section through the heater.

The heater comprises, in general, a substantially closed water tank 1, an outer upright cylindrical casing 2 having an open top and supporting legs 3, a pan 4 adapted to close the top of the casing and serve as a receiver for water, and a heating unit 5 secured in the bottom of the casing for heating the water in tank 1.

The tank 1 is preferably constructed of two drawn tub-like halves of sheet metal secured together and sealed by the crimped joint 6 extending circumferentially of the tank midway in its height. The tank 1 should be constructed of corrosion resistant metal such as stainless steel. It may be ordinary steel with a corrosion resistant lining such as galvanizing or ceramic enamel and may have a welded joint between its parts.

The outer casing 2 is of thin sheet metal and of a larger diameter than the tank 1 to provide a substantial radial space therebetween which is filled with heat insulation 7. The upper edge of the casing is rolled outwardly to provide a reinforced rim 8 for supporting the pan 4.

The sheet metal pan 4 is circular and relatively shallow with its upper edge curved outwardly and crimped with the outer edge of a sheet metal splash guard 9 to provide a rim 10 resting on rim 8 of the casing.

The splash guard 9 extends circumferentially around the inside of the upper portion of the pan 4 and prevents spilling of the water when rapidly pouring a pail full into the top, making it unnecessary to extend the sides of the pan upwardly to a greater height which would require lifting of the pail higher in pouring. Furthermore, by having the rim 10 rest on rim 8 the latter serves to reinforce the former against deformation from the weight of the pail in pouring or from other causes.

The bottom of the pan 4 is spaced above the top of tank 1 to provide for covering the latter with insulation 7. The pan bottom has a drain opening 11 located near one side and toward which the bottom slants. A flange 12 extends downwardly around the opening 11 and makes a slide fit inside the upper flared end of a stand pipe 13. The pipe 13 is disposed vertically in insulation 7 between tank 1 and casing 2 and extends downwardly to a point below tank 1 where it bends inwardly and connects to a T member 14, the upper branch of which is secured to the tank bottom at an inlet opening 15 registering therewith and the lower branch of which is closed by a threaded drain plug 16.

The outlet opening 17 for tank 1 is in the top and registers with an inverted U-shaped syphon discharge pipe 18 which has its inner end secured to tank 1 and which extends through insulation 7 and casing 2 with its outer end extending downwardly at a distance from the casing to provide for the filling of a pail, placed therebeneath, with water.

An air inlet tube 19 connects the upper end of tank 1 to the upper end of pipe 13 to control the syphon action when water is being discharged from the tank, and to provide for the escape of steam in the event of overheating or of boiling to sterilize the water. The inner end of pipe 19 extends downwardly about an inch into tank 1 and the breaking of the syphon action occurs when the water level lowers to the level of the inlet end of pipe 19. The outer end of tube 19 opens into the inlet pipe 13 at a level above the uppermost extent of pipe 18.

The casing 2 has a sheet metal bottom 20 with a downwardly extending peripheral flange 21 which sets into the lower end of the casing. The legs 3 are preferably three in number and each is secured in place by one or more attaching screws 22 threaded into corresponding posts 23 protruding from the side of the casing 2. Each leg 3 has inwardly and upwardly protruding lugs 24 over which the flange 21 and the lower edge of casing 2 hook for supporting the same.

The bottom 20 supports the insulation 7 and also brackets 25 which are preferably welded thereto and extend upwardly to support the tank 1 in spaced relation to the bottom. The bottom 20 also has a relatively large central opening 26 through which the heating unit 5 is inserted.

The heating unit 5 comprises a refractory partitioned base 27 with upwardly and downwardly extending peripheral flanges 28 having a total height equal to the vertical space between the bottom 20 and the tank 1. The base 27 is supported on a cover plate 29 which covers the underside of opening 26 and is secured to bottom 20 by screws 30.

The base 27 is partitioned to provide a heater compartment 31 and a thermostat compartment 32. The heater compartment 31 contains an electric resistance heating plate 33 which is mounted on springs 34 which press the same upwardly against the bottom of tank 1. By employing a spring mounting for the heating plate 33 the latter is held in proper heat transfer engagement with the tank regardless of manufacturing tolerances of the several parts.

The thermostat compartment 32 contains a thermostat switch 35 responsive to heat from the bottom wall of tank 1 for the purpose of opening the circuit of the heating plate when the water in the tank has reached a predetermined temperature. The thermostat 35 may be adjusted to operate at any desired temperature by means of the vertical shaft 36 extending downwardly through cover plate 29 and to the lower end of which a horizontal lever arm 37 is secured.

The lead cord 38 for supplying electric current to the heater plate 33 extends downwardly through cover plate 29 and has a suitable terminal plug 39 for connection to a standard wall socket outlet.

For the purpose of preventing drumming of the tank wall or undue deflection of its top and bottom, the metal of the latter is placed under tension, after the two halves of the casing are drawn, by forming a circular bead or depression 40 therein. The bead 40 in the tank bottom is preferably located to register with a central space in the heating plate 33.

The two tub-like halves of casing 2 are formed substantially similar and are adapted to volume production of these parts.

The heater operates at all times with the tank 1 full of water to the level of the inner end of discharge pipe 18, the water in the tank being kept hot and at the desired temperature by the heating plate 33 controlled automatically by the thermostat switch 35.

When it is desired to obtain a quantity of hot water from the heater, the same quantity of cold water is poured into pan 4, thereby forcing the desired quantity out through pipe 18 and replacing it in the tank with the cold water. In this way there will always be water in the tank and there will be no danger of injury to the tank from overheating by running dry.

Various embodiments of the invention may be employed within the scope of the accompanying claims.

I claim:

1. In a water heater of the class described, an upright cylindrical casing having a reinforced upper edge, and a filling pan constituting a cover for the casing and having an upper rim supported on the edge of the casing, the pan being relatively shallow and having a splash guard therein, said splash guard being crimped around the rim of the pan to reinforce the same and the pan rim and reinforced casing edge cooperating to prevent denting of each other in service.

2. In a water heater of the class described, a closed tank having a syphon outlet for heated water near its top and an inlet for cold water near its bottom, a filling pan above the tank and connected by a pipe to said inlet, and a vent tube connecting the upper end of the tank to said pipe.

3. In a water heater of the class described, a closed tank having a syphon outlet for heated water near its top and an inlet for cold water near its bottom, a filling pan above the tank and connected by a pipe to said inlet, and a vent tube connecting the upper end of the tank to said pipe at a point above the uppermost level of said syphon outlet.

4. In a water heater of the class described, a storage tank to be heated, a heat insulating housing therefor having an opening in its bottom, a removable electric heating unit disposed in said housing opening and comprising a refractory base partitioned into a heating compartment and a control compartment, an electric heating element in said heating compartment for heating the tank, a thermostat control switch in said control department for automatically closing and opening the heater circuit in response to heat from the tank, and a manual lever extending vertically downward through the refractory base and out of the heater for adjusting the thermostat switch to operate at desired temperatures, said refractory base insulating said compartments against loss of heat downwardly.

5. In a water heater, a storage tank to be heated, an external casing housing said tank, insulation material disposed between the casing and tank to prevent loss of heat from the water stored in the tank and having an opening therethrough giving access to the bottom of the tank, and a unitary refractory substantially hollow base member disposed within the opening beneath the tank and open to the tank, and wall members in said base member separating the bottom of said tank from said casing and insulating material, and an electric heating element disposed in said base member in contact with the bottom of the tank and insulated from the casing and insulation material by said wall members.

6. In a water heater, a storage tank to be heated, an external casing housing said tank, insulation material disposed between the casing and tank to prevent loss of heat from the water stored in the tank and having an opening therethrough giving access to the bottom of the tank, and a unitary refractory substantially hollow base member disposed beneath said tank within said opening and provided with a circumferential wall closing off the insulation from the inside of said base and the bottom of the tank, and a partition separating the base into two separate compartments open to the bottom of the tank for location of a thermostat unit in one compartment and a heating unit in the other compartment with each of said units being in contact with the bottom of the tank and separated from each other by said partition.

7. In a water heater, a storage tank to be heated, an external casing housing said tank, insulation material disposed between the casing and tank to prevent loss of heat from the water stored in the tank and having an opening therethrough giving access to the bottom of the tank, and a unitary refractory substantially hollow base member disposed beneath said tank within said opening and provided with a circumferential wall extending between the casing and tank and supported by the casing to close off the insulation from the bottom of the tank, and a partition in said base member dividing the same into a separate compartment for location therein of a thermostat in contact with the bottom of the tank and a second separate compartment for receiving a heating unit in contact with the bottom of the tank.

ERNST R. KOPPEL.

REFERENCES CITED

The following references are of record in the file of this patent:

UNITED STATES PATENTS

| Number | Name | Date |
|---|---|---|
| 1,318,168 | Newsom | Oct. 7, 1919 |
| 1,704,413 | Wait | Mar. 5, 1929 |
| 1,880,255 | Johnson | Oct. 4, 1932 |
| 2,066,190 | Swars | Dec. 29, 1936 |
| 2,148,407 | Pierson | Feb. 21, 1939 |
| 2,158,681 | Schulte | May 16, 1939 |
| 2,259,544 | Black | Oct. 21, 1941 |
| 2,269,448 | Ferris | Jan. 13, 1942 |
| 2,288,510 | Brannon | June 30, 1942 |
| 2,299,053 | Ferris | Oct. 13, 1942 |

FOREIGN PATENTS

| Number | Country | Date |
|---|---|---|
| 519,017 | Great Britain | Mar. 14, 1940 |